Aug. 25, 1964         L. R. ALLEN         3,145,842
PROCESS FOR THE EXTRUSION OF FINE WIRE
Filed May 17, 1962
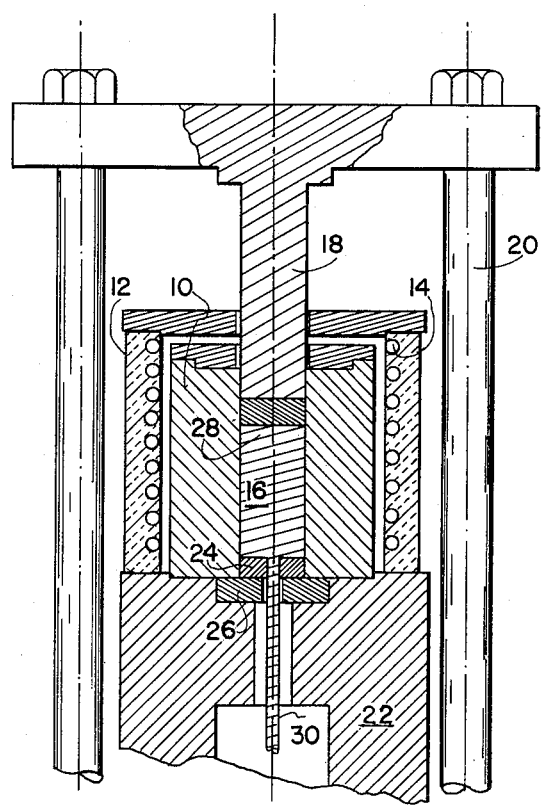
INVENTOR.
Lloyd R. Allen
BY
Edward A. Gordon

United States Patent Office 3,145,842
Patented Aug. 25, 1964

3,145,842
PROCESS FOR THE EXTRUSION OF FINE WIRE
Lloyd R. Allen, Belmont, Mass., assignor, by mesne assignments, to National Research Corporation, a corporation of Massachusetts
Filed May 17, 1962, Ser. No. 195,623
4 Claims. (Cl. 207—10)

This invention relates to metallurgy and more particularly to a method of extruding metals and alloys to produce ultrafine wires. This application is in part a continuation of my copending application Serial No. 189,590, filed April 23, 1962.

Heretofore production of ultrafine wires has been achieved by drawing processes whereby the metal or alloy is drawn through a hole in a plate or block of harder material known as a die. This operation converts the starting material, a rod, for example, to an elongated product of reduced cross-section. The drawing process is repeated using dies with smaller holes until the desired reduction in area and cross-section is obtained. The wire drawing process, while effective to produce wires, is accompanied by numerous disadvantages. For example, due to the work hardening which takes place during cold drawing the ductility of the metal wire decreases and tensile strength increases with the result that the metal wire produced tends to become hard and brittle and often requires annealing to permit still further reduction to smaller sizes or diameters. Such drawing processes are relatively slow and add greatly to the cost of the drawn wire. For example, the cost of a series of dies is quite large.

In the extrusion of metals wherein a heated billet, suitably confined, is expressed through a die orifice, considerable difficulty has been encountered because of the lack of control of such factors as the speed of extrusion, the temperature of extrusion, the extrusion ratio, and the extrusion pressure and flow stress. While various extrusion processes have been successfully practiced in producing extruded products of relatively large dimensions such as rods, tubes, and the like, attempts to apply such known extrusion practice to the production of ultrafine wires have not been generally successful.

Accordingly a principal object of the present invention is to provide a process of extruding metals and alloys to produce ultrafine wires.

Another object of the present invention is to provide a process of extruding metals and alloys to produce wires thereof having diameters of less than about 10 mils (.01 inch).

A further object of the present invention is to provide an ultrafine wire extrusion process which is effective in producing a more economic product than heretofore possible.

Other objects of the invention will in part be obvious and will in part appear hereinafter.

The invention accordingly comprises the product possessing the features, properties and the relation of components and the process involving the several steps and the relation and order of one or more of such steps with respect to each of the others which are exemplified in the following detailed disclosure and the scope of the application of which will be indicated in the claims.

For a fuller understanding of the nature and objects of the invention reference should be had to the following detailed description taken in connection with the accompanying drawing which is a diagrammatic, fragmentary sectional view of an extrusion apparatus for practicing the present invention.

In accordance with the present invention whereby the above objects are achieved, and the disadvantages of the prior art overcome, the metal to be extruded is first treated to remove inclusions such as graphite, carbides, oxides, and dirt to provide a billet in which the particle size of inclusions is less than 20 percent and preferably less than 10 percent of the diameter of the wire to be extruded. Although the particle size of inclusions must be less than 20 percent of the wire diameter, it is to be understood that it is preferable that the billet material be free of inclusions. Further, where the metal to be extruded is an alloy, the alloy is prepared or treated to provide a billet of the alloy having a particle size of the second phase or intermetallic harder constituents of less than 20 percent of the product wire diameter. The extrusion feed stock or billet material thus prepared is first heated to an initial temperature at which the compressive flow stress of the billet material is about 10–25 percent of the room temperature value. The heated billet is then expressed through a sharp or shearing edged die opening at a sufficient extrusion rate to further heat the billet by internal friction to a temperature which is in excess of the initial temperature and below the melting point and/or solidus temperature whereby the billet material is extruded as an ultrafine wire.

It has been discovered, in accordance with the present invention that, in order to obtain uniform continuous extrusion of ultrafine wire, the metal or alloy to be extruded must be free of hard particles having a size in excess of 20% of the diameter of the ultrafine wire to be extruded. By the term "hard particle" as used in the specification and claims is meant inclusions such as graphite, carbides, oxides, dirt and other foreign impurities and/or intermetallic particles such as intermetallic compounds or hard second phases which are present in certain alloys.

In a preferred embodiment of the present invention, the non-intentional hard particle inclusions are removed by zone melting techniques which are familiar to those skilled in the art. In this embodiment of the invention the metal to be extruded or the metals which form the alloy to be extruded are zone melted to remove inclusions having a particle size in excess of 20 percent of the diameter of the ultrafine wire. Preferably the zone melting is carried out in vacuum or in a clean atmosphere of inert gas such as argon or under a suitable flux.

In another embodiment of this aspect of the invention, the inclusions in the metal are removed by filtration techniques. In this embodiment of the invention the heated molten metal is passed through a ceramic or stainless steel sieve of suitable mesh orifice size to filter out the inclusions. Preferably the filtration is carried out in vacuum or a clean atmosphere of inert gas.

With respect to alloys the particle size of intermetallic particles may be reduced by rapidly cooling the alloy from a molten condition. In one embodiment of the present invention the molten alloy is poured in a stream through a stainless steel or ceramic screen into a container of distilled water. In this manner the molten alloy is rapidly cooled and formed into shot in which the intermetallic particle size is reduced to less than about 5 microns. The screen serves to form equal streams of the molten alloy which upon introduction into the water are rapidly cooled and formed into shot. Preferably the heating and pouring is carried out under clean atmosphere of a non-reactive inert gas such as argon or nitrogen.

In the preferred embodiment of this aspect of the invention the alloy is heated and the molten alloy poured into a heavy walled chill mold such as copper or graphite to rapidly cool the molten alloy. Preferably the mold is cooled by a coolant such as water although other cooling media may be employed. The heating, pouring and casting is preferably carried out under vacuum. In this manner, the intermetallic particle size of less than about 2 to 5 microns can be achieved.

It has been further discovered in accordance with the present invention that for proper extrusion conditions the billet of metal or alloy, prepared as described above, should be initially heated to a temperature at which the compressive flow stress is about 10–25 percent of the room temperature value. By compressive flow stress is meant the value of strain or compression required to cause plastic deformation. The heated billet is then expressed through the die opening at a sufficient rate to further heat the billet by internal friction of deformation to a temperature which is in excess of the initial temperature and below the solidus temperature of the metal. The term "solidus temperature," as used in the specification and claims, is intended to include in its scope the melting point of metals or the temperature of appearance of the first liquid when the alloy is slowly heated.

In accordance with the present invention one of the important features is that of maintaining the temperature of the metal being extruded within the above-mentioned temperature interval; that is, between the initial temperature and the solidus temperature in order to obtain continuous uniform extrusion of ultrafine wire. It has been determined that once the particular metal to be extruded has been heated to the initial temperature the temperature to which the metal will be raised during the extrusion due to the heat of deformation will be controlled by the extrusion rate and hence the ram speed.

One important aspect of the present invention is that the billet material be extruded through a sharp or shearing edged orifice in a die having a flat surface adjacent the billet material; that is to say the surface of the die against which the billet material is placed should not have any coning or tapering lead-in surface or rounded edge to the die orifice. By extruding the billet material through this type of die the extrusion can be carried out at lower pressures which permit higher extrusion rates of the wire. Thus the internal frictional heating of the billet material at the point of maximum deformation can be sufficiently controlled to maintain the proper temperature interval for extrusion. Additionally the extrusion can be carried out without exceeding the limiting stresses for the extrusion tools. With respect to the ram speed it is to be understood that for a given extrusion rate the ram speed will vary with the extrusion ratio.

Reference will now be made to the drawing which illustrates a diagrammatic, fragmentary, sectional view of a direct vertical extrusion apparatus of the type used in practicing the present invention. In the drawing, 10 represents the billet container having a ½ inch inner diameter bore. Heating member 12 containing heating coils 14 surrounds the billet container 10 and heats the metal billet 16 by radiation to the desired initial temperature. Extending into the billet container is a ram 18 which is supported on suitable columns 20. The billet container 10 is supported on die holder 22 and is provided with a shearing-edged flat die 24 and die backup adapter ring 26. Positioned between the ram and the billet is a suitable closure disc 28. The ram 18 is advanced against the billet by mechanical or hydraulic means not shown to express the billet material through the die 24 and extrude the ultrafine wire 30. The extruded wire is preferably collected on an automatically driven spool not shown.

Exemplary of actual practice as applied to the extrusion of ultrafine wire of aluminum and aluminum base alloys, it has been found that for proper extrusion of aluminum or aluminum alloy which has been treated to remove and/or reduce hard particles the billet should be initially heated to a temperature of about 400° C. The billet is then expressed through the die at a sufficient rate whereby the temperature of the billet does not exceed about 550° C. When the temperature of the aluminum or aluminum base alloys exceeds about 600° C. the extrusion interrupts itself by spitting molten aluminum or aluminum alloy at a ram speed of less than about .015 to .02 inch per minute. When the temperature is maintained at about 450° C. a maximum ram speed of about .5 inch per minute is achieved. A ram speed of .5 inch per minute using the ½ inch diameter billet is equivalent to 532 feet per minute of .0014 inch wire. When a billet of aluminum or aluminum alloy is heated to an initial temperature of above about 550° C. the extrusion interrupts itself by spitting molten aluminum at ram speeds as low as 0.10 inch per minute. It will be manifest then that the proper temperature interval for extrusion of aluminum and aluminum alloys to produce ultrafine wire is between about 400–550° C.

The invention will now be described by way of the following non-limiting examples:

EXAMPLE 1

In this example an aluminum alloy containing approximately .6% silicon; .8% magnesium; the balance being essentially aluminum was prepared using chemically pure zone melted metals. The aluminum alloy so prepared was then heated in a crucible to a temperature of about 750° C. and then poured into a water cooled heavy wall copper chill mold to rapidly cool the molten alloy. The heating, pouring and casting of the aluminum alloy was carried out under a vacuum of about .01 mm. Hg abs. The casting was then removed and the surface cleaned by pickling in a caustic soda solution for 1 to 5 minutes following which is was rinsed and dried. The billet so prepared was substantially completely free of dirt content. The intermetallic particle size of the alloy billet was less than about 5 microns. The ½ inch diameter billet was then placed in the extrusion liner and heated to a temperature of 425° C. At this temperature the compressive flow stress is about 18 percent of the room temperature value. The billet was then expressed through a die having an orifice of .0032 inch diameter at extrusion rates of 60–100 feet per minute of .0032 inch wire. The reduction ratio was $2.5 \times 10^4$ to 1.

EXAMPLE 2

In this example aluminum metal was zone melted to provide a ½ inch diameter aluminum billet which was free from all hard particles having a size in excess of about 1 to 2 microns. The aluminum billet was then placed in the extrusion liner and heated to an initial temperature of 445° C. At this temperature the compressive flow stress is about 12 percent of the room temperature value. The billet was then expressed through a die having an orifice of .004 inch diameter at extrusion rates of 30–40 feet per minute of .004 inch aluminum wire. The reduction ratio was $1.5 \times 10^4$ to 1.

While preferred embodiments of the invention as practiced with respect to aluminum and aluminum alloy have been described in the foregoing examples the table set forth below is exemplary of the invention as applied to other materials. Included in the table are Examples 1 and 2.

Table.—Extrusion of ½ Inch Diameter Billet Materials

| Billet material | Extrusion temperature interval (° C.) | Initial temperature (° C.) | Extrusion rate (ft./min.) | Wire diameter (inch) | Extrusion ratio: 1 |
| --- | --- | --- | --- | --- | --- |
| Al | 400–550 | 445 | 60–100 | .0032 | 25,000 |
| Al alloy (Al.6Si.8Mg) | 400–500 | 425 | 30–40 | .004 | 15,000 |
| Bi | 225–265 | 246 | 62 | .01 | 2,500 |
| Cd | 200–300 | 255 | 150 | .005 | 10,000 |
| In | 25–140 | 100 | 25 | .0006 | 300,000 |
| Mg | 300–500 | 320 | 300 | .0027 | 35,000 |
| Sn | 140–210 | 145 | 300 | .0014 | 125,000 |
| Zn | 250–400 | 370 | 316 | .005 | 10,000 |
| Zn alloy (Zn–4Cu) | 235–360 | 325 | 276 | .005 | 10,000 |
| Pb | 200–310 | 210 | 125 | .0014 | 125,000 |

Since certain changes may be made in the above products and process without departing from the scope of the invention herein involved, it is intended that all matter contained in the above description, or shown in the accompanying drawings, shall be interpreted as illustrative and not in a limiting sense.

What is claimed is:

1. The process of extruding metals including alloys thereof to produce a fine wire having a diameter of less than about .01 inch comprising forming a billet of said metal having hard particle sizes of less than 20 percent of said wire diameter, heating said billet to an initial temperature at which the compressive flow stress is about 10–25 percent of the room temperature value, expressing the heated billet through a shearing edged opening in a substantially flat surface at a sufficient extrusion rate to further heat said billet at the point of maximum deformation by internal friction to a temperature which is in excess of said initial temperature and below the solidus temperature of the metal and collecting the extruded wire.

2. The process of extruding aluminum and alloys thereof to produce a fine wire having a diameter of less than about .01 inch comprising forming a billet of said metal having hard particle sizes of less than 20% of said wire diameter, heating said billet to an initial tempera- in excess of about 400° C., expressing the heated billet through a shearing edged opening in a substantially flat surface at a sufficient extrusion rate to further heat said billet at the point of maximum deformation by internal friction to a temperature below about 550° C. and collecting the extruded wire.

3. The process of extruding aluminum metal to produce a fine wire having a diameter of less than .01 inch comprising forming a billet of said metal having hard particle sizes of less than about 20% of said wire diameter, heating said billet to an initial temperature of about 445° C., expressing the heated billet through a shearing edged opening in a substantially flat die at a sufficient extrusion rate to further heat said billet at the point of maximum deformation by internal friction to a temperature below about 500° C. and collecting the extruded aluminum wire.

4. The process of claim 1 wherein the metal extruded is a low melting point metal selected from the group consisting of bismuth, cadmium, indium, magnesium, tin, zinc, lead and alloys thereof.

References Cited in the file of this patent

UNITED STATES PATENTS

| | | |
|---|---|---|
| 2,630,623 | Chisholm et al. | Mar. 10, 1953 |
| 2,686,864 | Wroughton et al. | Aug. 17, 1954 |
| 2,720,310 | Yack | Oct. 11, 1955 |
| 2,755,925 | Boccon-Gibod et al. | July 24, 1956 |
| 2,974,790 | Murphy et al. | Mar. 14, 1961 |

FOREIGN PATENTS

| | | |
|---|---|---|
| 909,329 | Germany | Apr. 15, 1954 |
| 564,081 | Great Britain | Sept. 12, 1944 |

OTHER REFERENCES

"Wire and Wire Products," October 1960, volume 35, Number 10, pp. 1341, 1344, and 1345.

Metals Handbook, 1948 edition, published by The American Society For Metals, Cleveland (p. 975).